United States Patent [19]

Carré et al.

[11] Patent Number: 4,605,103
[45] Date of Patent: Aug. 12, 1986

[54] MULTI-DISC BRAKE

[75] Inventors: Jean-Jacques Carré, Le Raincy; Ghislain Escarabajal, Meaux, both of France

[73] Assignee: Societe Anonyme D.B.A., Paris, France

[21] Appl. No.: 623,041

[22] Filed: Jun. 21, 1984

[30] Foreign Application Priority Data

Jun. 30, 1983 [FR] France .................. 83 10917

[51] Int. Cl.$^4$ ............................................. F16D 55/36
[52] U.S. Cl. ............................. 188/71.5; 188/218 XL; 192/70.2; 384/906; 403/359
[58] Field of Search .................... 188/71.5, 71.3, 73.2, 188/264 AA, 18 R, 18 A, 218 R, 218 XL, 370; 192/70.2, 85 AA, 110 B; 308/3 R, 6 C; 384/906; 403/359; 464/158; 301/6 E

[56] References Cited

U.S. PATENT DOCUMENTS

| 1,646,125 | 10/1927 | Tuttle | 192/70.2 |
| 1,961,207 | 6/1934 | Dierfeld | 188/71.5 X |
| 1,990,510 | 2/1935 | Winkler | 192/70.2 X |
| 3,008,547 | 11/1961 | Rockwell | 188/72 |
| 3,373,625 | 3/1968 | Keller | 403/359 X |
| 3,435,936 | 4/1969 | Warman | 192/113 |
| 3,707,207 | 12/1972 | Kondo | 188/71.5 |
| 4,142,807 | 3/1979 | Fisher et al. | 403/359 X |
| 4,304,501 | 12/1981 | Gordon et al. | 403/359 |
| 4,416,564 | 11/1983 | Billet et al. | 403/359 X |

FOREIGN PATENT DOCUMENTS

| 2043911 | 3/1972 | Fed. Rep. of Germany . |
| 3142941 | 5/1983 | Fed. Rep. of Germany . |
| 699993 | 2/1931 | France . |
| 1074902 | 10/1954 | France . |
| 1319456 | 1/1963 | France . |
| 1547663 | 11/1968 | France . |
| 2410764 | 6/1979 | France . |
| 25651 | 10/1969 | Japan | 188/71.5 |
| 1087988 | 10/1967 | United Kingdom . |
| 2019528 | 10/1979 | United Kingdom | 403/359 |
| 2049845 | 12/1980 | United Kingdom . |

Primary Examiner—Bruce H. Stoner, Jr.
Assistant Examiner—Michael P. Gilday
Attorney, Agent, or Firm—Larry J. Palguta; Ken C. Decker

[57] ABSTRACT

The invention relates to a multi-disc brake comprising a stationary rotary disc (1) and a movable rotary disc (2) which is mounted on a splined sleeve (5) sliding on a splined part (3a) of a hub (3) which has an axis (4) and with which the disc (1) is solid. An assembly of friction blocks (6 to 9) can interact with the discs (1, 2) under the action of a hydraulic jack (13). These blocks occupy a limited angular sector over the periphery of the discs. The splines (23, 25) of the hub and of the sleeve have shaped flanks. A ring (30) for guiding the sleeve (5) radially relative to the hub (3) is provided at each of its ends, so as to prevent any jamming of the sleeve (5) because of the tendency of the disc (2) to rock under the action of the jack (13).

5 Claims, 5 Drawing Figures

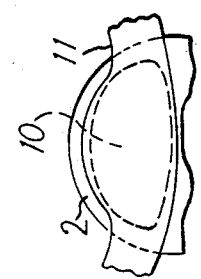
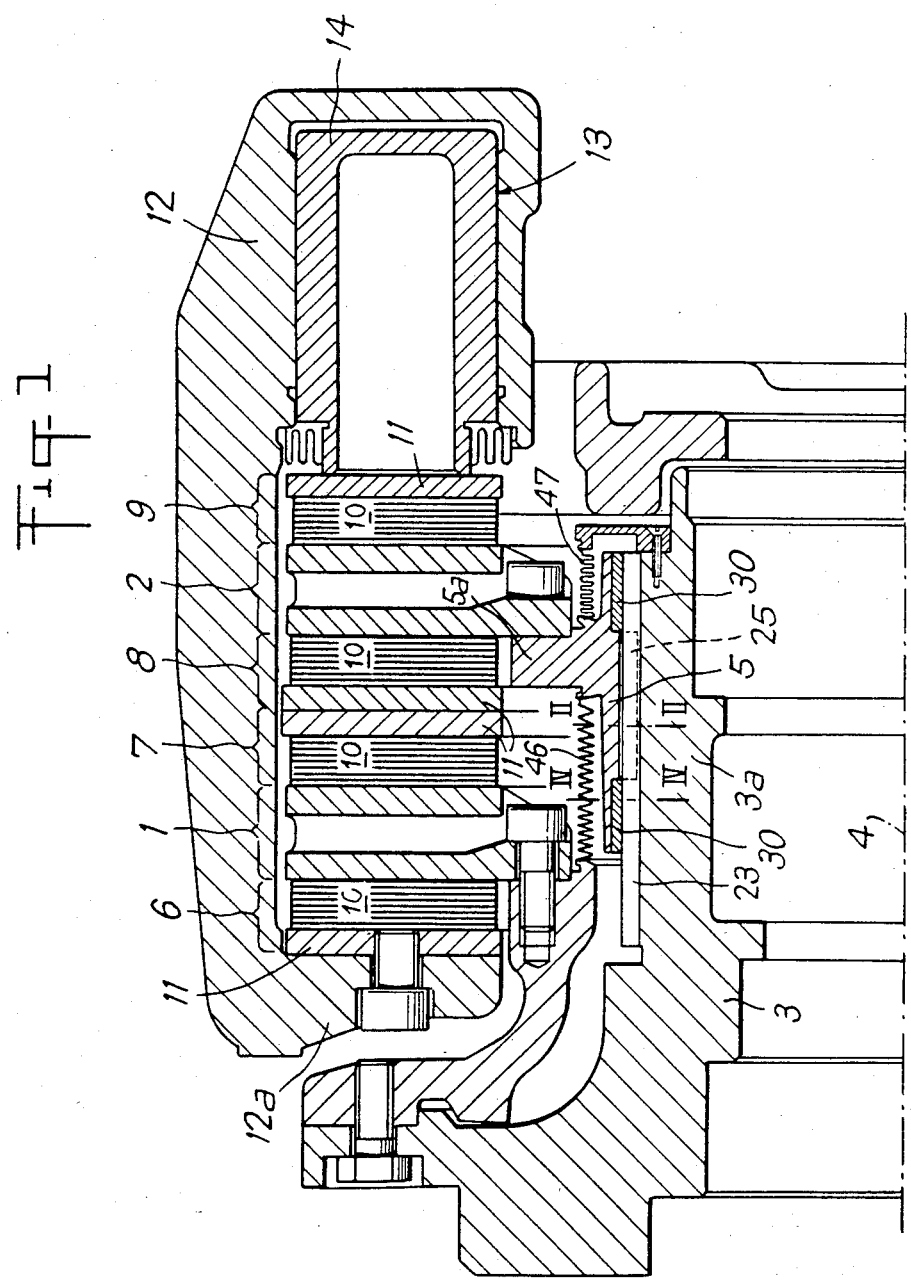

MULTI-DISC BRAKE

The invention relates to a multi-disc brake comprising a first rotary disc solid with a hub and a second rotary disc mounted on the hub with a possibility of sliding parallel to the direction of the axis of the latter, the axes of the hub and of the said discs coinciding with one another, and an assembly of friction blocks incorporating friction linings capable of being laid against the faces of the discs by an actuating device, such as a hydraulic caliper jack; a second disc is carried by an internally splined sleeve which can slide on an externally splined part of the hub, the mutual engagement of these splines ensuring that the second disc is driven in rotation by the hub.

When the splines have radial plane flanks, the sleeve is guided satisfactorily during is translational movements over the hub. However, it has been noted that the splines tend to dull, and this increases the friction and can result in the jamming of the sleeve and therefore of the disc which it carries, thus entailing serious disturbances in the operation of the brake, moreover, such splines must be produced by broaching which is an expensive method of machining.

Consequently, the flanks of the splines are given a form which is shaped in the manner of gear teeth, so that the flanks of two adjacent splines of the sleeve and of the hub are in contact only along a line substantially parallel to the axis. Another disadvantage arises when the brake linings are located on a limited angular sector of the periphery of the discs, as occurs in brakes required to undergo repeated violent actuation, such as the brakes of heavy-goods vehicles, the discs of which must present as large a surface exposed to the free air as possible for the purpose of cooling them. During a braking operation, the sliding disc, subjected to a translational movement solely in the region of the sector covered by the linings, tends to rock, its supporting sleeve assuming a certain inclination relative to the axis, and this can result again in jamming because of the slopes of the non-radial flanks of the splines.

To overcome this disadvantage, it is envisaged, according to the invention, that an arrangement for guiding the sleeve radially relative to the hub should be located at each of the ends of the hub, this arrangement ensuring that the sleeve is centered by means of its ends independently of the flanks of the splines. Thus, the sleeve is guided perfectly on the hub, without the risk that it will assume a disadvantageous inclination, the flanks of the splines being relieved of the job of guiding the sleeve radially.

In an advantageous embodiment, the radial-guidance arrangement mentioned above consists of an annular surface belonging to one of the mutually sliding elements (the sleeve or the hub), in sliding contact with a matching annular surface belonging to the other element, (the hub or the sleeve), one of these annular surfaces being located inside the other.

These two annular surfaces can be continuous surfaces, the splines of the sleeve and of the hub being interrupted in the region of these surfaces. They can also comprise a continuous annular surface, the splines of the element possessing it being interrupted in the region of this surface, and the discontinuous annular surface presented by the tips of the splines of the other element. In the latter case, the continuous surface preferably belongs to the sleeve and interacts with the tips of the splines of the hub.

Each continuous annular surface can be obtained by machining in the material of the sleeve or of the hub. It can also be formed by the annular surface (inner or outer, depending on whether the sleeve or the hub is concerned) of a separate ring, advantageously made of bronze.

Other characteristics and advantages of the invention will emerge more clearly from the following description of a non-limiting exemplary embodiment with reference to the attached drawings.

FIG. 1 shows, in axial section, a disc brake arranged according to the invention.

FIG. 1A is a schematic illustration of a brake lining extending over a limited annular sector of an associated disc.

Figure 2:
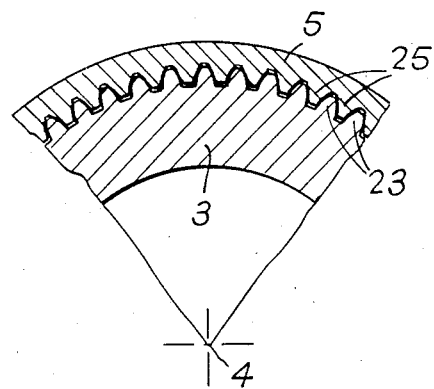
FIG. 2 shows a partial section along the line II—II of FIG. 1.

The multi-disc brake illustrated in FIG. 1 comprises a first rotary disc 1, called an outer disc, and a second disc 2, called an inner disc, both being mounted on a hub 3, the axis 4 of which coincides with those of the discs 1 and 2. While the disc 1 is solid with the hub 3 and is therefore fixed in the direction of the axis 4, the disc 2 can be displaced in this direction, being fixed to an internally splined sleeve 5 which can slide on a splined cylindrical part 3a of the hub, round which it is engaged, being driven in rotation by the hub because its splines 25 engage with the splines 23 of the hub 3.

Each brake disc 1 or 2 interacts with a pair of friction blocks 6 and 7 or 8 and 9 located on either side of the corresponding brake disc 1 or 2 and capable of being applied against the lateral faces of the latter. Each of these friction blocks 6, 7 8 and 9 comprises a friction lining 10 and a lining-holding plate 11, each lining 10 interacting with the adjacent face of the corresponding disc 1 or 2.

A caliper 12 is arranged over the brake discs 1, 2 and their friction blocks 6, 7 8 and 9, as to cover the assembly consisting of the discs and blocks. In the part of the caliper 12 located on the same side as the inner disc 2 there is a control motor, such as a hydraulic jack 13, the piston 14 of which is capable of acting on the lining-holding plate 11 of the inner block 9 and, as a result of reaction and because of its grooved nose 12a, on the lining-holding plate 11 of the outer block 6, so as to control the clamping of the assembly consisting of the discs and blocks in the direction of the axis 4 and thus cause braking friction between each lining 10 and the matching disc face. This action is accompanied by a displacement of the inner disc 2 parallel to the axis 4 because the sleeve 5 slides on the part 3a of the hub 3, of which the splines parallel to the axis 4 are protected from dirt which could soil them by flexible bellows 46, 47 of cylindrical shape, which surround the sleeve 5 and the part 3a of the hub on either side of the ring 5a fastening the disc 2 to the sleeve 5.

Figure 3:
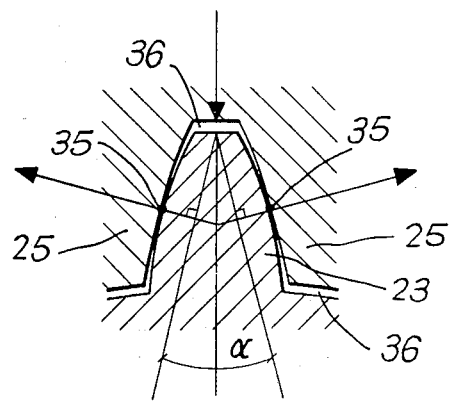
FIG. 3 shows, on a larger scale, some of the splines appearing in FIG. 2.

To prevent any risk of mutual jamming of the splines 23, 25 as a result of dulling, which would lead to jamming in the axial direction of the sliding disk 2, the flanks of the splines are not plane and radial, but shaped (FIG. 3) in the manner of involute gear teeth. The interacting flanks of the splines 23, 25 are then in contact not by means of surfaces, but along lines 35 substantially parallel to the axis 4, a gap 36 being provided between the tip of each spline and the bottom of the gap separating the two adjacent and opposite splines.

Figure 4:
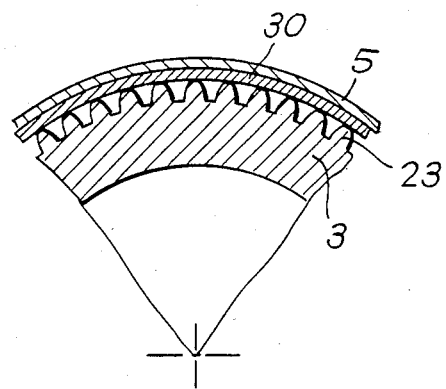
FIG. 4 shows a partial section along the line IV—IV of FIG. 1.

However, because the brake linings 10 cover only a limited angular sector (approximately 60°) over the periphery of the discs 1, 2, the compressive force generated by the jack 13 and the caliper 12 is exerted on the discs in this sector only, thus tending to cause the sliding disc 2 and its supporting sleeve 5 to rock relative to the axis 4. To prevent the angle of contact α of the splines 23, 25 from then causing the sleeve 5 to interfere with the hub 3 as a result of a wedge effect, resulting again in jamming of the disc 2, the sleeve 5 is provided, at each of its ends, with a guide ring 30 which bears by means of its inner annular surface on the tips of the splines 23 of the hub 3 (FIG. 4), the splines 25 of the sleeve 5 being shortened to make room for the said rings 30. It is these guide rings which absorb the rocking torque exerted by the disc 2 on the sleeve 5, so that any detrimental forces in the splines capable of producing jamming are eliminated.

Of course, the splines 23 of the hub are of sufficient length to provide a support for the entire inner surface of the rings 30 of the sleeve 5, whatever the position which the sliding disc 2 can assume during a braking operation.

We claim:

1. A multi-disc brake comprising a first rotary disc solid with a hub and a second rotary disc mounted on the hub for sliding movement parallel to an axis of the hub, the axis of the hub and axes of the discs coinciding with one another, and an assembly of friction blocks incorporating friction linings capable of engaging faces of the discs by means of an actuating device such as a hydraulic caliper jack, the linings extending only over a limited angular sector of the periphery of the discs, the second rotary disc carried by an internally splined sleeve which slides on an externally splined part of the hub, splines of the sleeve and hub engaged with one another to drive rotationally the second rotary disc with the hub, the splines having flanks shaped as gear teeth so that the flanks of two adjacent splines of the sleeve and hub are in contact only along a line substantially parallel to the axis of the hub, characterized in that the second rotary disc is mounted directly on the hub and located substantially in the middle of the sleeve, the brake including a radial-guidance arrangement for guiding the sleeve radially relative to the hub and provided at each axial end of the sleeve, the radial-guidance arrangement consisting of two continuous annular surfaces engaged with one of the sleeve and hub and in axial sliding contact with the other of the sleeve and hub, the splines of one of the sleeve and hub being interrupted by the continuous annular surfaces, each continuous annular surface consisting of a ring disposed within one of the sleeve and hub and axially slidably engaging the other of the sleeve and hub in order to maintain radial alignment of the sleeve relative to the hub, and the rings engaged slidably by a discontinuous annular surface comprised of tips of splines of the other of the sleeve and hub.

2. The brake according to claim 1, wherein the rings are disposed in the sleeve and slidably engage the tips of the splines of the hub.

3. The brake according to claim 2, wherein each ring extends axially to the respective axial end of the sleeve.

4. The brake according to claim 1, wherein the rings are made of bronze.

5. The brake according to claim 1, wherein each ring provides a smooth continuous inner diameter surface which axially slides on the splines of the hub without rotatable coupling therebetween.

* * * * *